US008783737B2

(12) United States Patent
Marschner et al.

(10) Patent No.: US 8,783,737 B2
(45) Date of Patent: Jul. 22, 2014

(54) CLOSURE LOCK

(75) Inventors: Kai Marschner, Halle (DE); Bert-Olaf Grimm, Leipzig (DE)

(73) Assignee: Eppendorf AG, Hamburg (DE)

( * ) Notice: Subject to any disclaimer, the term of this patent is extended or adjusted under 35 U.S.C. 154(b) by 675 days.

(21) Appl. No.: 12/928,699

(22) Filed: Dec. 16, 2010

(65) Prior Publication Data

US 2011/0181053 A1    Jul. 28, 2011

(30) Foreign Application Priority Data

Dec. 16, 2009    (EP) ..................... 09015558

(51) Int. Cl.
| | |
|---|---|
| E05C 3/06 | (2006.01) |
| E05B 47/02 | (2006.01) |
| F16P 3/08 | (2006.01) |
| B04B 7/06 | (2006.01) |
| E05B 47/00 | (2006.01) |
| A47L 15/42 | (2006.01) |

(52) U.S. Cl.
CPC .............. *F16P 3/08* (2013.01); *E05B 47/0012* (2013.01); *E05B 2047/0025* (2013.01); *E05B 47/023* (2013.01); *A47L 15/4259* (2013.01); *E05B 2047/003* (2013.01); *E05B 2047/002* (2013.01); *B04B 7/06* (2013.01)
USPC ........................................................ 292/195

(58) Field of Classification Search
CPC ............................. E05B 85/26; E05B 17/0025
USPC ........ 292/DIG. 69, 49, 51, 56, 64, 65, 95–98, 292/108–113, 121–124, 126, 194, 197, 199, 292/201, 219, 222–224, 280, 341.15, 292/341.17, DIG. 11, DIG. 62; 126/191, 126/192, 197, 201
See application file for complete search history.

(56) References Cited

U.S. PATENT DOCUMENTS

| | | | | | |
|---|---|---|---|---|---|
| 2,898,138 | A | * | 8/1959 | Van Noord | ..................... 292/122 |
| 3,566,703 | A | * | 3/1971 | Van Noord | ......................... 74/50 |
| 4,163,443 | A | * | 8/1979 | Peterson | ......................... 126/197 |
| 4,593,945 | A | * | 6/1986 | Arute et al. | ................... 292/201 |
| 4,793,640 | A | * | 12/1988 | Stewart, Sr. | ................... 292/201 |
| 4,838,586 | A | * | 6/1989 | Henne | ........................... 292/113 |
| 5,220,153 | A | * | 6/1993 | Malone et al. | ................ 219/412 |
| 5,440,103 | A | * | 8/1995 | Martin | ........................... 219/413 |
| 5,474,338 | A | * | 12/1995 | Buscher | ........................ 292/201 |
| 5,493,099 | A | * | 2/1996 | McWilliams, III | ............ 219/413 |
| 5,537,848 | A | * | 7/1996 | Grzanka et al. | .............. 70/279.1 |
| 5,997,055 | A | * | 12/1999 | Strathmann | ................... 292/201 |
| 6,364,376 | B1 | * | 4/2002 | Spargo | ............................ 292/97 |
| 6,648,380 | B1 | * | 11/2003 | Szablewski et al. | ........... 292/201 |

(Continued)

FOREIGN PATENT DOCUMENTS

| | | |
|---|---|---|
| DE | 19614122 A1 | 10/1997 |
| DE | 10015010 A1 | 10/2001 |
| EP | 1 092 828 A1 | 4/2001 |
| JP | 2008 194595 A | 6/2006 |

*Primary Examiner* — Kristina Fulton
*Assistant Examiner* — Nathan Cumar
(74) *Attorney, Agent, or Firm* — Von Rohrscheidt Patents

(57) ABSTRACT

A closure lock, in particular to a lock for a cover of a laboratory centrifuge and a housing of the laboratory centrifuge. The closure lock provides a particularly effective, loadable and safe lock which is not only actuatable through a power drive, but which also provides robust self blocking with respect to strong vibrations and high crash energies.

15 Claims, 8 Drawing Sheets

(56) References Cited

U.S. PATENT DOCUMENTS

| | | | |
|---|---|---|---|
| 6,886,869 B2 * | 5/2005 | Martinez et al. | 292/216 |
| 7,029,040 B2 * | 4/2006 | Lippoldt et al. | 292/201 |
| 7,036,853 B2 * | 5/2006 | Smock et al. | 292/109 |
| 7,040,673 B2 * | 5/2006 | Smock et al. | 292/109 |
| 2006/0119108 A1 | 6/2006 | Heid et al. | |
| 2007/0029814 A1 * | 2/2007 | Coleman et al. | 292/201 |
| 2008/0252083 A1 * | 10/2008 | Carabalona | 292/49 |
| 2008/0305938 A1 | 12/2008 | Hayasaka | |
| 2009/0079206 A1 * | 3/2009 | Hunt et al. | 292/216 |

* cited by examiner

CLOSURE LOCK

RELATED APPLICATIONS

This application claims priority from and incorporates by reference European Patent application EP 09015558.1-1252, filed on Dec. 16, 2009.

FIELD OF THE INVENTION

The present invention relates to a closure lock, in particular for locking a cover of a laboratory centrifuge at a housing of the laboratory centrifuge.

BACKGROUND OF THE INVENTION

Centrifuges, in particular laboratory centrifuges, have to be configured very safe with respect to locking the centrifuge cover at the centrifuge housing in order to minimize risk. The risk is represented by an unintentional opening of the centrifuge cover during operations, in particular represented by the rotor, which is then exposed and typically rotates at up to 16,000 RPM, and the risk is also represented by the samples arranged on the rotor, which are also exposed then. Also, for many other devices, a safe closure lock is advantageous for preventing accidents, for example, for laundry dryers, washing machines and doors, in particular trunk lids for motor vehicles.

It is known to use manual closures for safely supporting a cover at a housing. Closures of this type, however, are very difficult to operate, in particular for centrifuges.

Therefore, various power locks have already been developed. However, it is disadvantageous in the known power locks, that they are typically quite complex in configuration and furthermore require plural inputs for securing the functions of the lock, namely, for example, an input for actuating the lock hook and another input for actuating the blocking of the lock hook.

BRIEF SUMMARY OF THE INVENTION

Thus, it is an object of the present invention to provide a closure lock, which is simple in configuration, facilitates secure locking also under high loads as they can occur, for example, for centrifuges, and which does not require various inputs for securing the functions of the closure lock.

The object is achieved through a closure lock including at least one locking element which is movable in a locking element moving direction; and at least one input for moving the at least one locking element between an unlocked position for placing the closure into an unlocked condition and a locked position for placing the closure into a locked condition, wherein the at least one input is arranged movable in an input movement direction, wherein the lock includes a blocked condition in which the at least one locking element is blocked relative to movements in the locking element moving direction, wherein the at least one locking element is arranged at an output which is arranged movable in an output movement direction and which is connected to the at least one input at least in the blocked condition through a first form locking engagement, wherein the first form locking engagement is configured, so that it transfers no movement between the output movement direction and the input movement direction, wherein a second form and/or friction locking engagement is provided between the at least one input and the output for providing a movement transfer between the output movement direction and the input movement direction, and wherein the second form and/or friction locking engagement does not exist at least in the blocked condition, so that a self-blocking of the lock is caused at least in the blocked condition. Further objectives are achieve through the following, taken alone or in any combination:

the output is supported rotatable about an output rotation axle and/or the at least one input is supported rotatable about an input rotation axle;

wherein the output includes a guide slot for a lever element of a lever wheel arranged at the at least one input in order to provide the second form locking engagement and/or friction locking engagement, and wherein the guide slot preferably includes at least one portion which includes at least one wall section that does not extend perpendicular with reference to the output movement direction;

wherein the output includes a circular segment shaped section which engages a corresponding section of the output in a form locking manner at least in a locked condition of the lock in order to provide the first form locking engagement;

wherein a circular arc is not formed at least in portions between a lever element and the input rotation axle, so that the output is not in a form locking engagement with the at least one input at least for a period of time during a transition between the blocked condition and the unlocked condition;

wherein the at least one locking element is movably connected with the output;

wherein the at least one locking element is arranged rotatable about a locking element rotation axle at the output, wherein the locking element rotation axle and the output rotation axle do not coincide, wherein the output includes a guide element which engages a circular segment shaped cut out of the at least one locking element, and wherein the circular segment shaped cutout is arranged concentric to the locking element rotation axle and the at least one locking element is preloaded in closing direction;

wherein the at least one locking element is fixated at the output, in particular is integrally provided in one piece with the output;

wherein at least one end position switch is associated with the at least one input, wherein the at least one input actuates the end position switch when an end position of the lock is reached, and wherein the end position switch interrupts a power actuation of the at least one input; and wherein the input engagement devices are arranged at the at least one input for engaging corresponding supplemental engagement devices, so that the at least one input is actuatable by hand in order to facilitate opening and closing the lock by hand, and wherein the input engagement device is preferably configured as a hexagonal or polygonal socket arranged on the input rotation axle.

A closure lock according to the invention, advantageously for a closure of a centrifuge, in particular of a laboratory centrifuge, includes at least one locking element which is movable in a locking element moving direction, and at least one input for moving the locking element between an unlocked position for placing the closure into an unlocked condition, and a locked position for placing the closure into a locked condition, wherein the input is arranged movable in a input movement direction, wherein the lock is in a blocked condition in which the locking element is blocked relative to movements in the locking element moving direction, and is characterized in that the locking element is disposed at an output, which is disposed movable in an output movement direction and which is connected to the input at least in a blocked condition through a first form locking engagement, wherein the first form locking engagement is configured, so that no movement is transmitted between the output movement direction and the input movement direction, and wherein a second form and/or friction locking engagement is provided between the input and the output for providing a movement transfer between the output movement direction and the input movement direction, wherein the second form and/or friction locking engagement does not exist at least in blocked condition, so that a self-blocking of the lock is caused at least in the blocked condition.

In this context, the closing element movement direction is the direction of the movement of the closing element in a closing direction or in an opening direction. Input movement direction and output movement direction respectively are the directions of the movements of the input and the output, which are performed by the input and by the output, when the lock is being opened or closed.

Providing the first form locking engagement between input and output of the lock according to the invention, which causes a self-blocking of the lock, renders the lock configuration particularly simple and thus also particularly safe. Furthermore, only one input is required for actuating the output and the blocking, since the movement transfer between input and output is provided through a second form- and/or friction locking engagement, which however, is not provided in the blocked condition. This renders the lock not only inexpensive, but also particularly safe.

Thus, the self-blocking is provided in that the form locking with respect to the motion degrees of freedom of the input and the output is arranged and configured, so that a movement of the output does not cause a movement of the input and additionally also an at least small movement of the input does not cause a movement of the output.

Locked position of lock: output is in locking position, second form locking engagement is effective between input and output, a force loading the output against locking direction transfers through the second form locking engagement to the input so that it loads the input against input locking direction so that the output moves the input out of the locked condition into an open condition.

Blocked position of lock: output is in locking position, first form locking engagement is effective between input and output, a force loading the output against locking direction does not transfer through the second form locking engagement to the input so that it loads the input against input Ibcking direction so that the output cannot move the input out of the locked condition into an open condition.

A lock of this type also resists high vibration and crash energies, which can occur, for example, for centrifuges, since force introductions into the locking element cannot cause a movement of the input.

In known locks, however, the input was configured as a gear, which engages a corresponding gear of the output as described, for example, in DE 100 15 010 C2, upon which the present invention improves. Though there was also form locking engagement, however, the form locking engagement was not self-blocking, but only self-inhibiting, since a movement of the output also caused a movement of the input in a locked condition. When the input was directly coupled with the power drive, then the movement had to overcome the resistance of the power drive, for example, a motor, but there was no self-blocking. Thus, under high crash energies, a lock of this type was unreliable. Vice versa, a movement of the input as it can occur, for example, through vibrations caused a movement of the output.

Advantageously, the output is rotatable about an output rotation axle and/or the input is rotatable about an input rotation axle. This provides particularly space saving locks.

In a particularly advantageous manner, the output includes a guide slot for a lever element of a lever wheel, which is disposed at the input, which provides the second form and/or friction locking engagement. Thus, the lock is configured in a particularly simple manner. Then it is advantageous for the guide slot to include at least a portion, which includes at least one wall section that does not extend perpendicular to the movement direction of the output. This facilitates particularly fluid movements, which makes the lock run smoother and thus require less maintenance. Improved leverage during locking and unlocking furthermore requires less force, so that a power drive used for locking can be configured with less torque and thus also with smaller size.

As an alternative to a configuration of this type of the second form and/or friction locking engagement with the lever element and the guide slot, for example a friction locking engagement through a friction clutch can be provided, or a form locking engagement is provided through a rack and pinion drive. In all embodiments it has to be assured that the form and/or friction locking engagement disengages when the blocked condition is reached, so that a force introduction into the output cannot be transferred to the input, so that the input moves.

In an advantageous embodiment, the input includes a section with a circular arc shape, which engages a corresponding section of the output in a form locking manner in order to provide a first form locking engagement at least in a locked condition of the lock. This facilitates achieving a particularly simple first form locking engagement and very safe arresting. Thus, it is advantageous when the circular arc is not configured between the lever element and the input rotation axle at least in portions, so that the output is not in the first form locking engagement with the input at least from time to time during a transition between the blocked condition and the unlocked condition.

In a particularly advantageous embodiment, the locking element is connected with the output in a movable manner. This facilitates implementing various locks.

Thus, it is particularly advantageous for the locking element to be disposed at the output moveable in rotation about a locking element rotation axis, wherein the locking element rotation axis and the output rotation axle do not coincide, the output includes a guide element, which engages a curve segment of the locking element, is which is arranged concentric to the rotation axis of the locking element, and the locking element is preloaded in locking direction. This also causes the closing element to be pulled towards the input simultaneously with causing the locking. This is desirable in particular for centrifuges, when a seal is provided between the centrifuge housing and the cover, wherein the seal is configured to prevent an exit of centrifuge material from the centrifuge container.

Alternatively, it can also be provided that the locking element is fixated at the output, in particular that the locking element is an integral part of the output. This facilitates implementing locks with particularly simple configurations, for example, with a bar shaped locking element, which directly forms a portion of the output.

In a particularly advantageous embodiment, at least one end position switch is associated with the input, wherein the input actuates the end position switch when an end position of the lock is reached, wherein the end position switch interrupts the power actuation of the input. This facilitates operating the lock in a substantially automated manner.

For increased safety, it is advantageous to arrange input engagement devices at the input for engagement with corresponding supplemental engagement devices, so that the input is actuatable by hand, so that the lock can be opened and/or closed by hand, wherein the input engagement device is advantageously configured as a hexagonal socket or polygonal socket arranged on the rotation axis of the input. Supplemental engagement devices of this type can be, for example, Allen wrenches, screw drivers and similar.

BRIEF DESCRIPTION OF THE DRAWINGS

Features and additional advantages of the present invention are evident from the description of exemplary embodiments with reference to the drawing figures, wherein.

DETAILED DESCRIPTION OF THE INVENTION

Figure 1A:
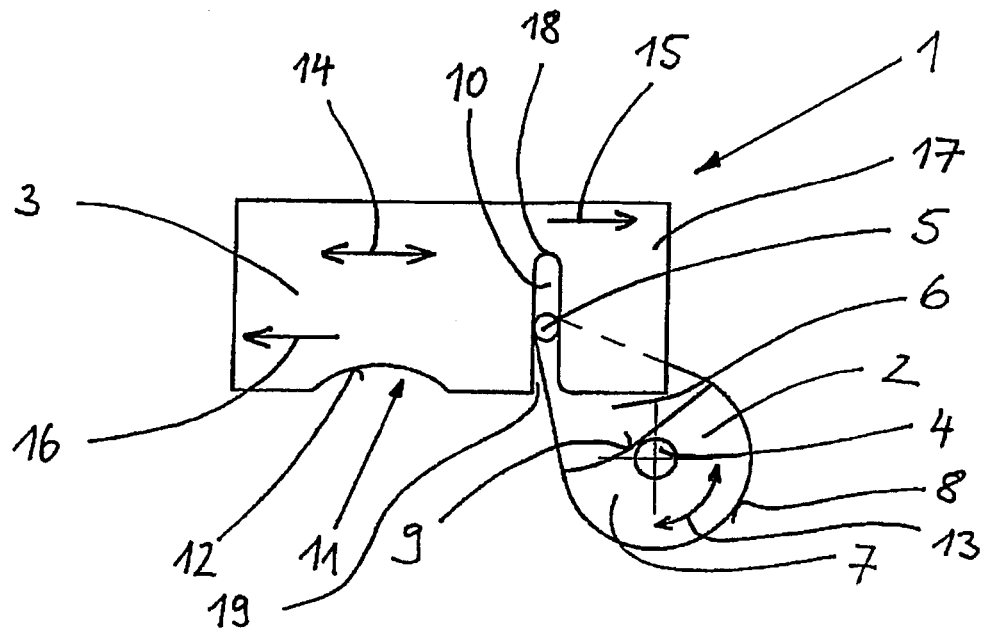
FIGS. 1a-1c illustrate a first embodiment of the lock according to the invention.

In the following description, identical and like elements are designated with identical or similar reference numerals also when this is not explicitly illustrated.

Figure 1B:
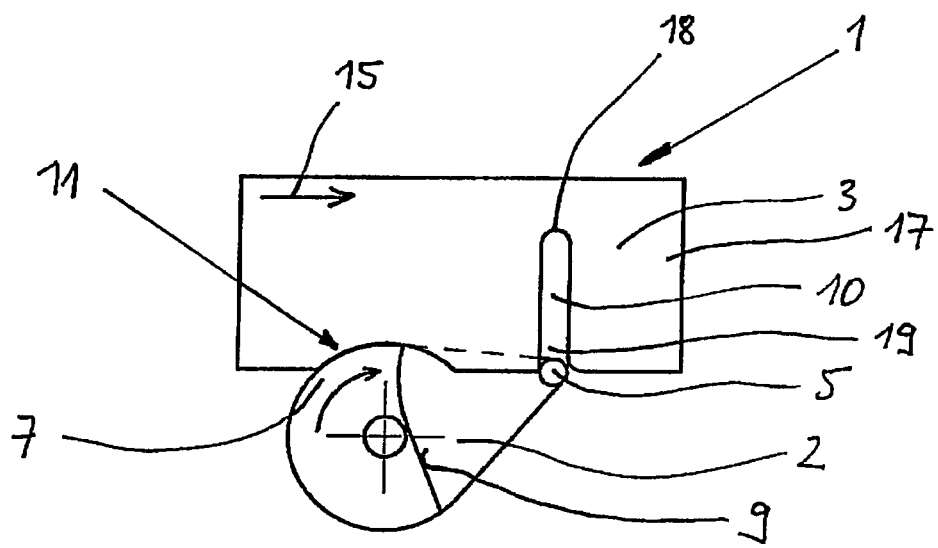
Figure 1C:
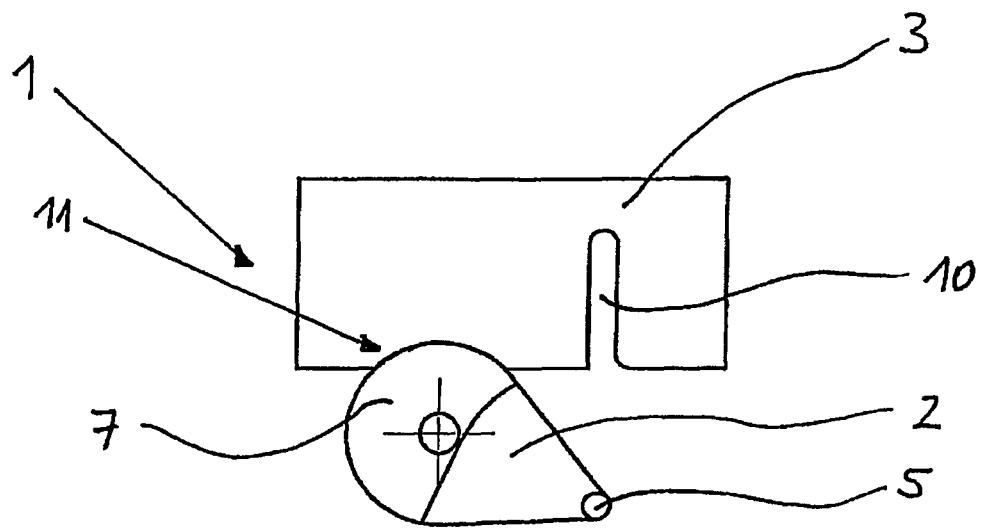

FIGS. 1a-1c illustrate a first embodiment of the lock 1 according to the invention in three different locking phases in a schematic depiction.

The lock 1 includes an input 2, which is actuated by a power drive, for example, a motor (not illustrated), and an output 3. The input 2 is configured as a lever wheel, which is arranged on the input rotation axle 4, so that the lever wheel is rotatable. The lever wheel 2 includes a lever element 5, which protrudes in a pin shape relative to the base 6 of the lever wheel 2. The lever wheel 2 additionally includes a circular segment 7 with a circular outer contour 8, which also protrudes relative to the base 6 of the lever wheel 2. Between the lever element 5 and the input rotation axle 4, the circular segment 7 is defined in portions through an outer contour 9, which is recessed towards the input rotation axle 4 relative to the circular outer contour 8.

The output 3 essentially has a rectangular cross section, and includes a guide slot 10 for receiving the lever element 5, and includes an undercut 11 with a circular arc shaped concave contour 12. The convex contour 8 of the circular segment 7 of the input 2 and the concave contour 12 of the undercut 11 of the output 3 are thus adapted to one another, so that they can be brought into form locking engagement.

As recited supra, the input 2 is disposed rotatable on the input rotation axle 4, namely in input movement direction 13. The output 3 is fixated through suitable guide devices (not illustrated) with reference to the input 2, so that the output 3 is only movable laterally in output movement direction 14, wherein the direction 15 is a closing direction and the direction 16 is an opening direction.

The right side section of the output 3 is configured as a bar shaped locking element 17, which can be brought into engagement with a suitable lock (not illustrated).

FIG. 1a illustrates the lock 1 in an unlocked condition, in which the output 3 can be moved freely through the input 2 in both directions 15, 16, in that the lever element 5 runs in the guide slot 10 and thus transmits the movement between the input 2 and the output 3. On the other hand, also a movement of the output 3 would be transmitted through the guide slot 10 onto the lever element 5, which would render the input 2 movable against the resistance of the power drive driving the input rotation axle 4.

FIG. 1b illustrates the lock 1 in locked condition, in which the locking element 17 is illustrated in a position that is deployed the most in a locking direction 15. The transition between the positions according to FIG. 1a and FIG. 1b is provided in that the lever element 5 moves in the guide slot 10 to the top 18 of the guide slot 10, when the input 2 is rotated clockwise, and then the lever element moves from the top of the guide slot back to the base 19 of the guide slot 10. The lateral movement of the output 3 at the circular arc section 7 of the input 2 is thus facilitated through the shape of the recessed outer contour 9. Only after a particular lateral movement depth of the drive 3 relative to the output 2, the circular segment 7 engages the undercut 11 in a form locking manner, which prevents any additional lateral movement of the output 3 in a closing direction 16. On the other hand, the lever element 5 is still in engagement with the guide slot 10, so that a counterclockwise rotation of the input 2 would lead to a lateral movement in opening direction. Thus, the first form locking engagement 7, 11 and also the second form locking engagement 5, 10 are provided simultaneously. A force introduction into the output 3 generated e.g. through a centrifuge crash could also cause a movement of the input 2 in counterclockwise direction, and thus an opening of the lock 1 through force transmission between the shaped slot 10 and the lever element 5.

FIG. 1c eventually illustrates the lock 1 in locked and blocked condition, wherein the locked condition is configured self-blocking. The self-blocking is caused by the fact that no engagement of the lever element 5 in the guide slot 10, thus no second form locking engagement 5, 10 exists anymore, but only the first form locking engagement between the circular segment 7 and the undercut 11 is provided between the input 2 and the output 3. Due to the degrees of freedom of movement of input 2 and output 3 and the configuration and arrangement of the form locking engagement between the input 2 and the output 3, a movement of the input 2 and the output 3 is effectively prevented, and thus irrespective whether the force is introduced into the input 2, or the output 3, or into the input 2 and also into the output 3, and also irrespective of the size of the force introduced. Only a continuous backward rotation of the input 2 into a position in which the lever element 5 engages the guide slot 10 again would lead to unlocking.

For a lock 1 according to the invention, it thus has to be provided that no second form locking engagement between the lever element 5 and the guide slot 10 exists in a locked condition of the lock 1, in which the output 3 is also blocked. Preferably, there should be an even small distance between the lever element 5 and the guide slot 10, so that a penetration of the lever element 5 into the guide slot 10 is impossible, also under large forces and vibrations. The lock 1 according to the invention according to FIG. 1 is very safe and also particularly simple in configuration.

When the lock 1 according to the invention is configured according to FIG. 1a-FIG. 1c the output 3 performs a translatoric movement while the input 2 performs a rotational movement. The reverse configuration can certainly also be used, wherein the input 2 then performs a translatoric movement while the output 3 rotates.

Figure 2A:
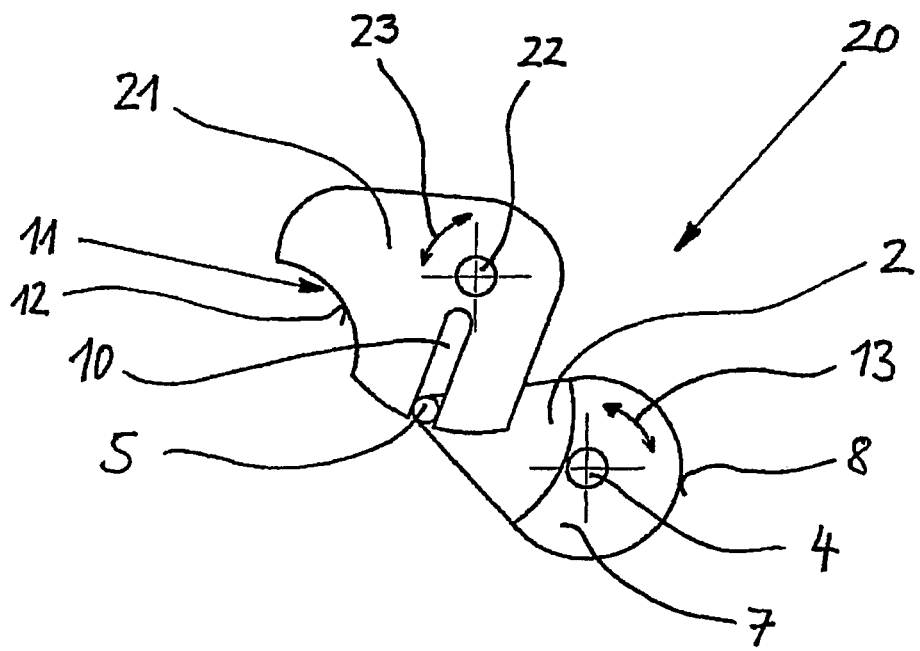
FIGS. 2a-2c illustrate a second embodiment of the lock according to the invention.
Figure 2B:
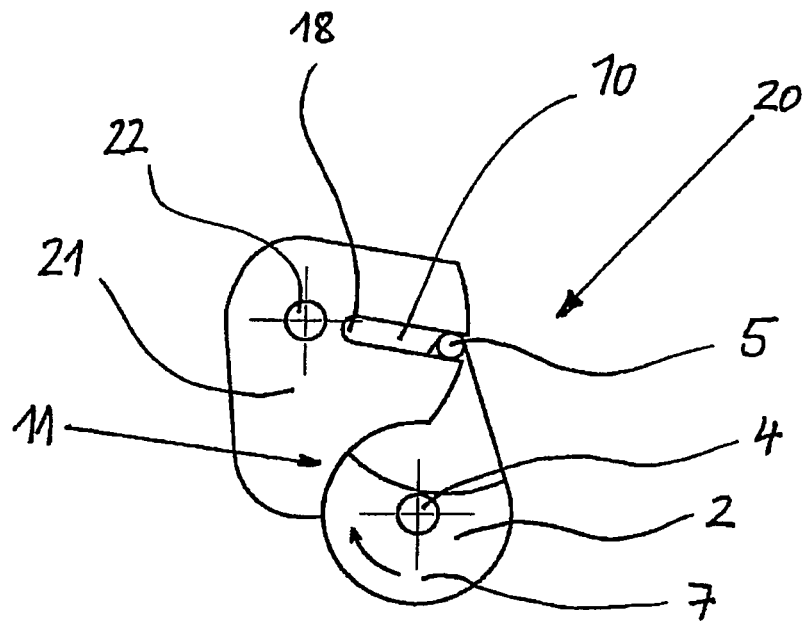

FIGS. 2a-2b illustrate an alternative embodiment of the lock 20 according to the invention, wherein the different conditions of the lock 20 are in turn illustrated analogous to FIG. 1. Differently from the lock 1 according to FIG. 1, the lock 20 includes an output 21 which is supported rotatable on an output rotation axle 22. Thus, the output 21 does not perform a lateral movement, but a rotational movement in output rotation direction 23. The locking element is not separately illustrated for the lock 20, wherein the locking element can be configured, for example, as a catch hook and can be arranged in a suitable manner at the output 21.

With reference to the particular locking stages the interaction of the input 2 and the output 21 corresponds to the interaction of the lock 1 according to FIG. 1, so that a dedicated description is redundant.

Figure 3A:
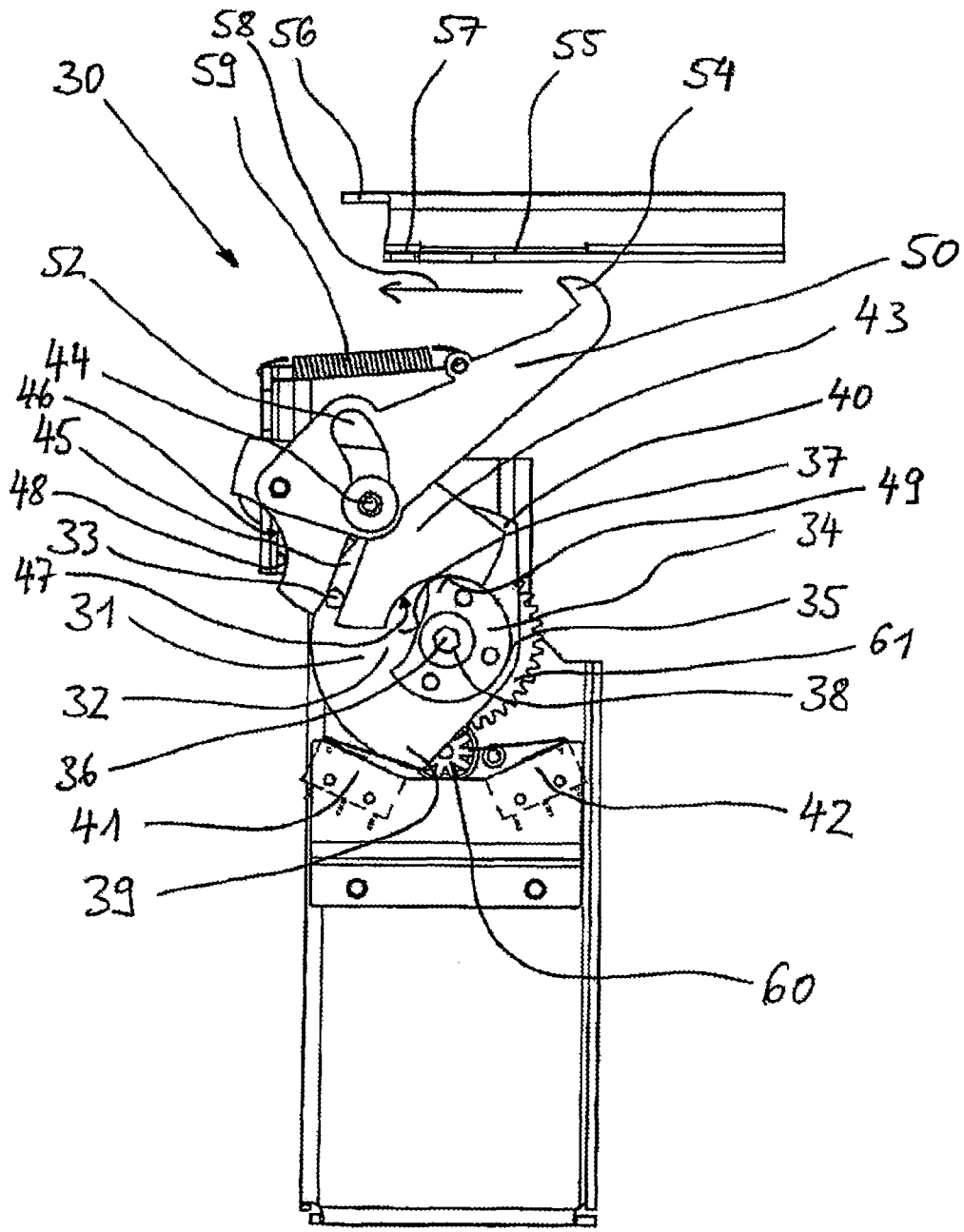
FIGS. 3a and 3b illustrate a third embodiment of the lock according to the invention.
Figure 3B:
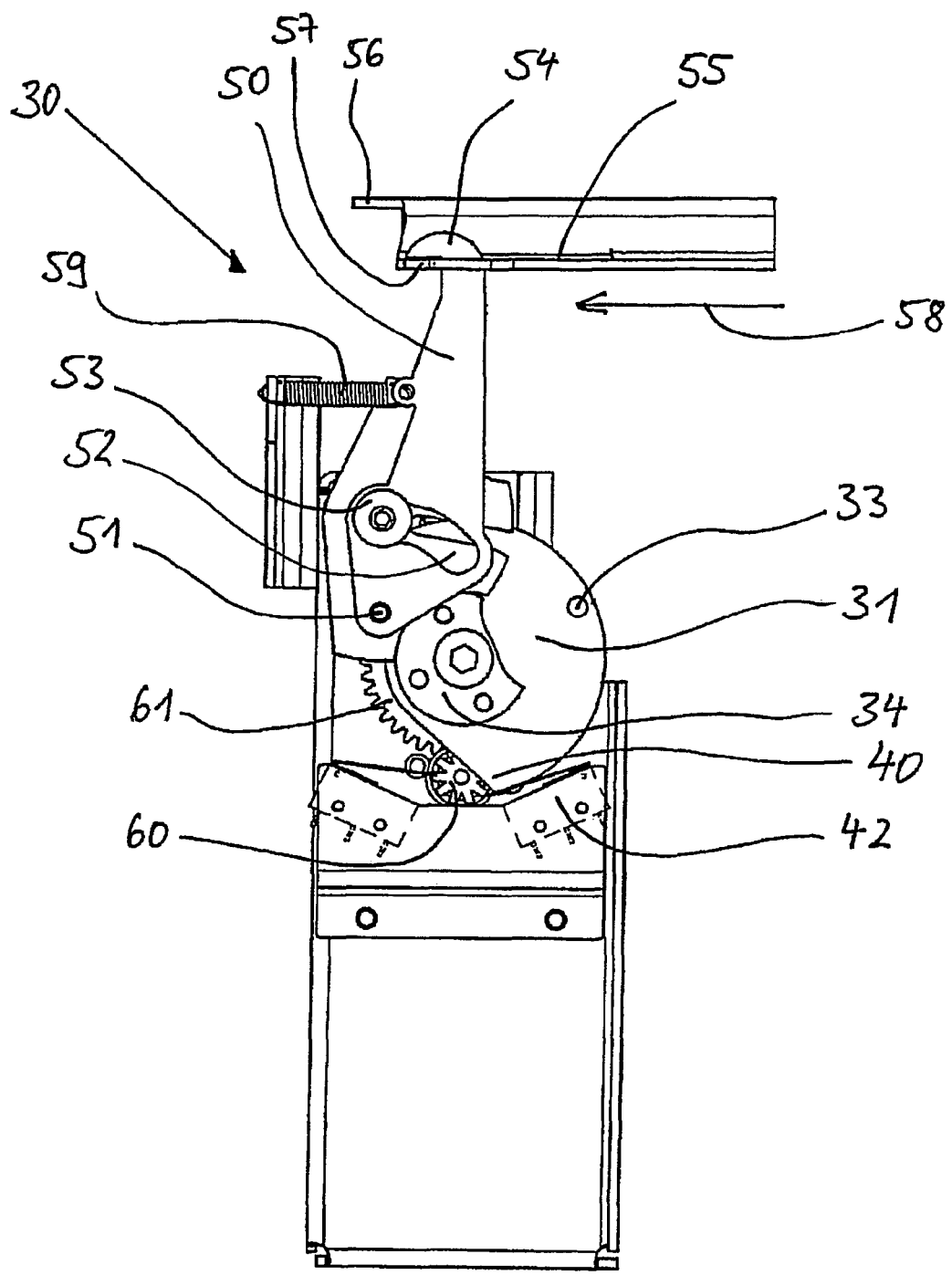

FIGS. 3a and 3b schematically illustrate the lock 30 according to the invention in an exemplary embodiment. The lock 30 includes a lever wheel 31 functioning as an input, wherein a protruding lever element 33 and a circular segment 34 are in turn disposed at the base 32 of the lever wheel 31. The circular segment 34 includes a portion with a circular convex outer contour 35 and includes a portion between the input rotation axle 36 and the lever wherein the portion includes an outer contour 37 which is recessed in inward direction towards the input rotation axle 36 with reference to the circular contour 35. Additionally an internal hexagon 38 is disposed on the input rotation axle 36 and functions as an input engagement device. Eventually the base 32 of the lever wheel 31 has an uneven outer contour with two shifting surfaces 39, 40 which are adapted to actuate the end position switches 41, 42.

The lock 30 additionally includes an output 43 which is disposed rotatable on the output rotation axle 44 and includes a guide slot 45 and undercuts 46, 47 which respectively have a concave circular segment shaped contour 48, 49. The concave contours 48, 49 of the undercuts 46, 47 are thus configured to be brought into form locking engagement with the circular segment shaped contour 35 of the circular segment 34.

Furthermore, the lock 30 includes a catch hook 50 configured as a locking element, wherein the catch hook is arranged rotatable on the locking element rotation axle wherein the locking element rotation axle 51 does not coincide with the output rotation axle 44. The catch hook 50 includes a circular segment shaped cut out 52 extending concentric about the locking element rotation axle 51, wherein a guide element 53 runs in the circular segment cut out and is disposed on the output rotation axle 44.

The catch hook 50 includes a claw 54 which reaches through the slot 55 of the partially illustrated closing cover 56 of a laboratory centrifuge which is not illustrated and interacts with a stop 57 in the locked position. The catch hook 50 is preloaded by the spring element 59 in the locking direction 58.

The input 31 is power driven through the gears 60, 61 through a motor that is not illustrated and that is configured to be switched on and off through end position switches 41.

Subsequently the function of the lock 30 is described, wherein the lock 30 is illustrated in unlocked condition in FIG. 3a and the lock 30 is illustrated in locked and self blocking condition in FIG. 3b.

Figure 2C:
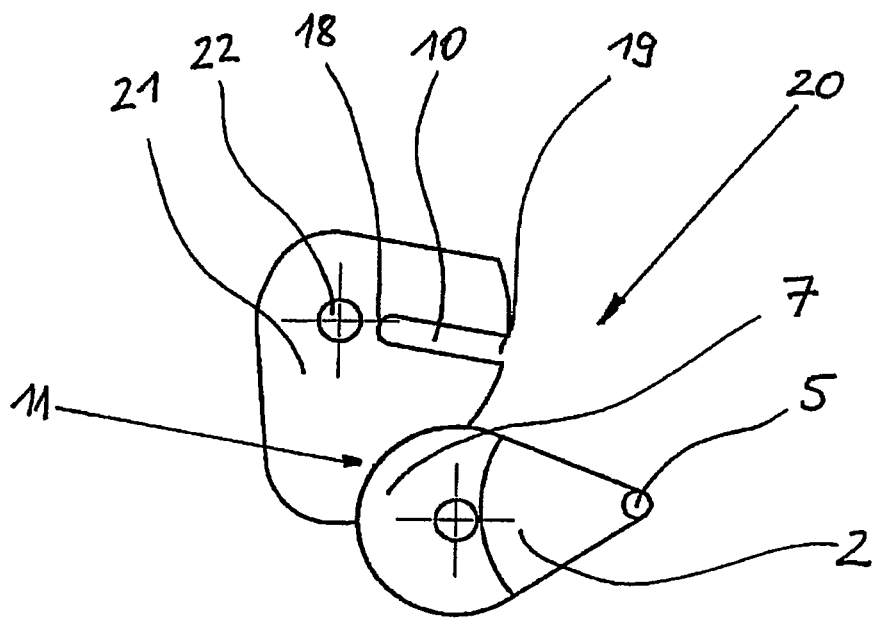

Eventually the interaction of the input 31 and the output 43 corresponds to the interaction described for the locks 1 and 20 according to FIG. 1 and FIG. 2, so that repeating the description is omitted. However, it is novel over the locks 1 and 20 that the output 43 provides form locking engagement also in unlocked condition through the undercut 47 with the circular segment 34 of the input 31.

It is also apparent from FIG. 3a that the lever element 33 engages the guide slot 45 in unlocked condition and thus provides the second form locking engagement. Therefore no self blocking for the output 43 is provided in spite of the first form locking engagement between the undercut 47 and the circular segment 34. This self blocking, however, can be achieved in a simple manner in that the shifting surface 40 for the end position stop 41 is moved closer to the lever element 33, so that the end position is only reached when the lever element 33 has left the guide slot 45.

This way, the lock provides self blocking for the output 43 in an unlocked condition of the lock and also in a locked condition of the lock, so that in turn any undesired movement of the output 43 and/or the input 31 is effectively and safely prevented for large force introductions.

The rotatable arrangement of the catch hook 50 at the output 43 and its guidance through the curve segment 52 at the guide element 53 is facilitated through a preload in locking direction 58 provided by the spring element 59, so that the catch hook 50 when transitioning from an unlocked condition to a locked condition performs a non circular movement. More precisely after an initial circular movement about the rotation axle 51 of the output 43 a movement is performed which pulls the claw 54 in a direction towards the input 51, without the catch hook 50 being moved further in closing direction 58. Thus, the cover 56 is firmly pressed on a seal element (not illustrated) during locking, wherein the seal element is disposed at the housing of the laboratory centrifuge, wherein the housing is not illustrated. Thus, the lock 30 is configured so that the self blocking condition, in which the second form locking engagement between the input 31 and the output 43 is disengaged, occurs when the cover 56 has reached its desired end position at the housing.

Reference is made to DE 100 15 010 C2, which is incorporated herein in its entirety by this reference, with respect to the exact function and additional feasible configurations of the interaction between the catch hook 50 and the output 43, whose disclosure and teachings are incorporated into the instant description by reference in their entirety. All features described therein for the interaction of the catch hook 50 and the output 43 can thus be advantageously used in the present invention.

With reference to DE 100 15 010C2 it is appreciated that though it is recited therein that the illustrated lock is self inhibiting, namely on the one hand in that the rotation axle of the catch hook in locked condition is pivoted beyond an extension of a straight line through the front edge of the stop and the support element, and furthermore another contribution is provided by the drive motor and the input transmission. This, however, apparently is only an inhibition but no self blocking of the lock since for a suitable force impact upon the catch hook, namely against the closing direction a rotation of the output is caused in a clock wise direction, wherein the rotation is inhibited by the input and the motor and the transmission, but cannot be prevented.

Though the invention was described supra with reference to a lock 1, 20, 30 of a closure for a centrifuge, in particular a laboratory centrifuge the lock 1, 20, 30 according to the invention can certainly also be advantageously used for other devices and assemblies. In particular always when a locking element shall resist manipulation like e.g. for safety doors, vaults, refrigerated lockers and similar.

It is particularly characteristic for the lock 1, 20, 30 according to the invention that it is configured self blocking without electricity on a purely mechanical basis and thus also resists the strongest vibrations and crash energies. Only one power drive is required for the lock 1, 20, 30 according to the invention, since the locking process, as well as the blocking process, are continuously provided one after another through the input 2, 32.

Exemplary embodiments of the output 80a, 80b, 80c, 80d, 80e according to the invention are illustrated in FIGS. 4a-4e which can be used in the lock 30 according to the invention according to FIG. 3, wherein the guide slot 81a, 81b, 81c, 81d, 81e is slightly modified respectively.

Figure 4A:
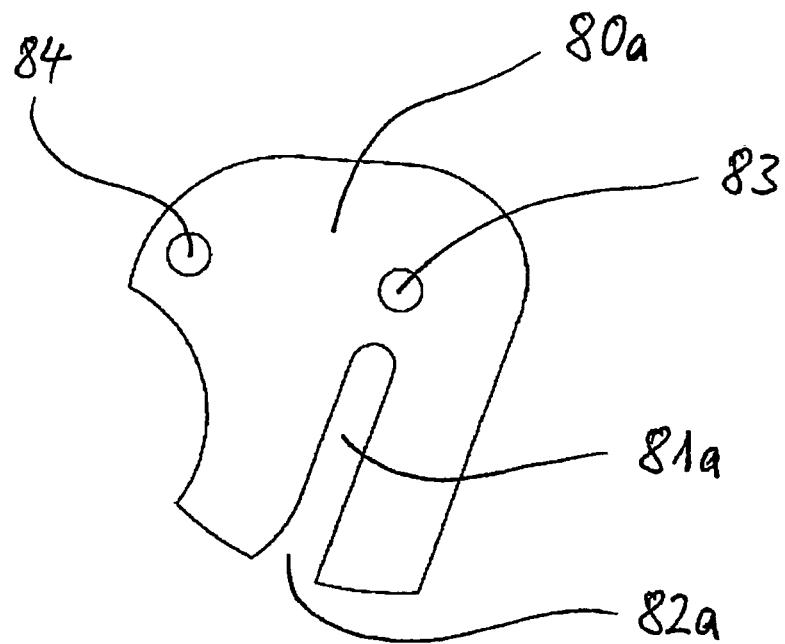
FIGS. 4a-4e illustrate various embodiments of the output of the lock according to the invention according to FIG. 3.

An output 80a is illustrated in FIG. 4a whose guide slot 81a at the base 82a is configured rounded on the left side which makes the retraction and deployment of the lever element 33 from the guide slot 81a go smoother. Advantageously a rounded portion can be provided on the other side. The output 80a furthermore includes a bore hole 83 for receiving the output rotation axle 44 and it includes another bore hole 84 for receiving the locking element rotation axle 51. The straight configuration of the guide slot 81a yields sine wave shaped velocity and torque curves.

Figure 4B:
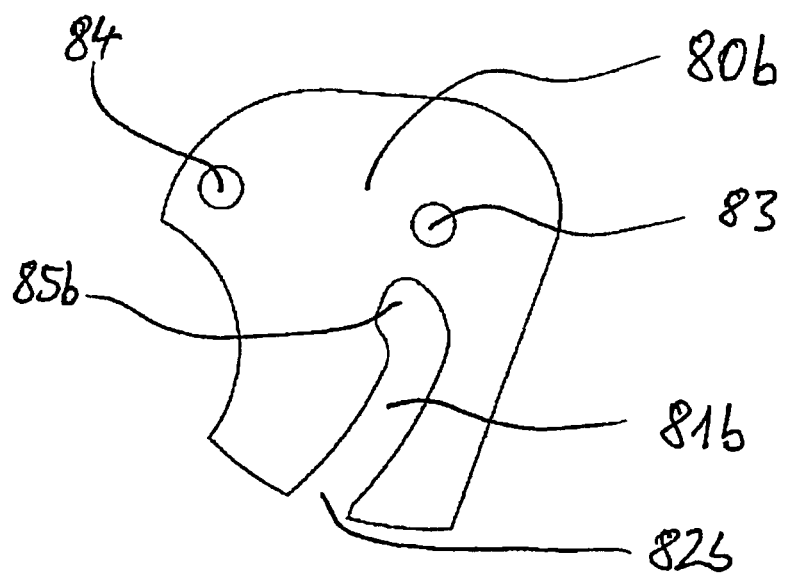

FIG. 4b illustrates an output 80b, whose guide slot 81b is configured rounded on both sides at the base 82b, which makes retracting and deploying the lever element 33 at the guide slot 81b go smoother. Additionally, the output 80b includes a rounded portion 85b in a direction towards the bore hole 84 for receiving the locking element rotation axle 51, which requires a lower input torque in particular lever positions relative to the drive of FIG. 4a. Additionally, the guide slot 81b is inclined away from the bore hole 84 for receiving the locking element rotation axle 51 between the base 82b and the round portion 85b with reference to the bore hole 83 for receiving the output rotation axle 44. Thus the guide slot 81b includes no guide surfaces extending perpendicular to the movement direction of the output 80b at least in some portions, which improves the leverage for the opening and closing operation.

Figure 4C:
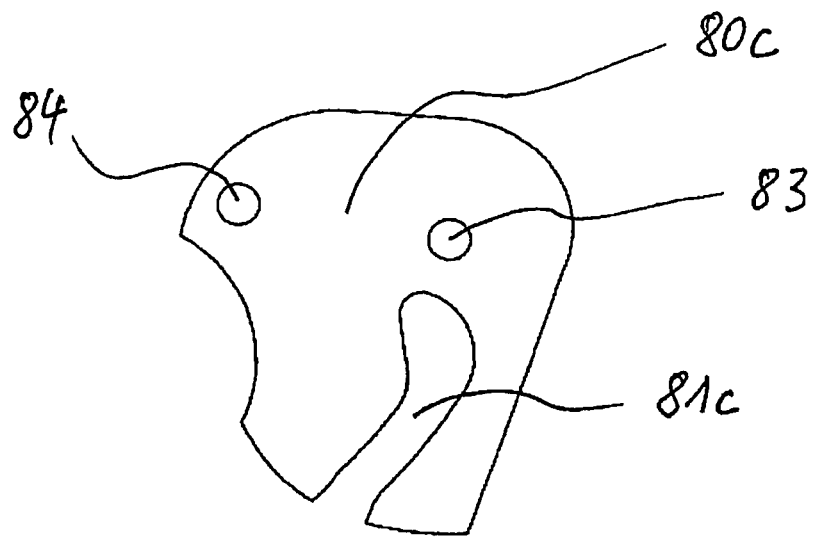
Figure 4D:
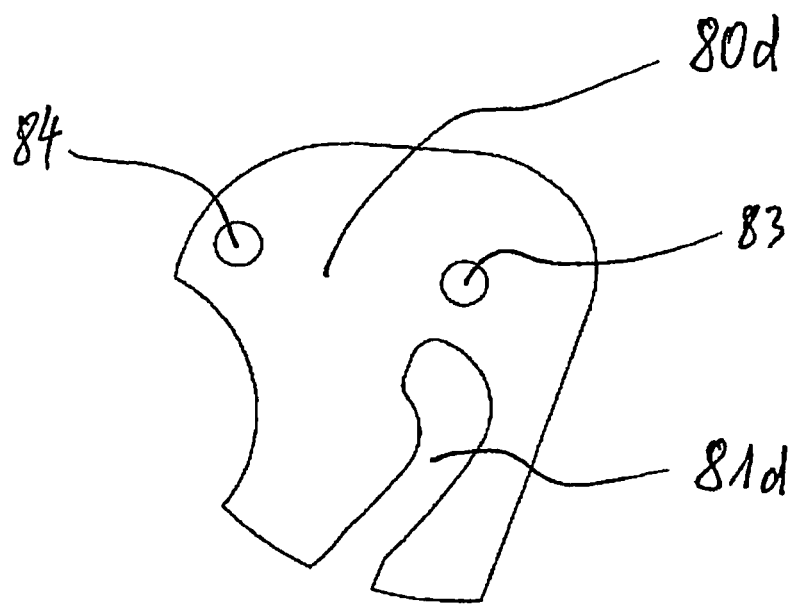
Figure 4E:
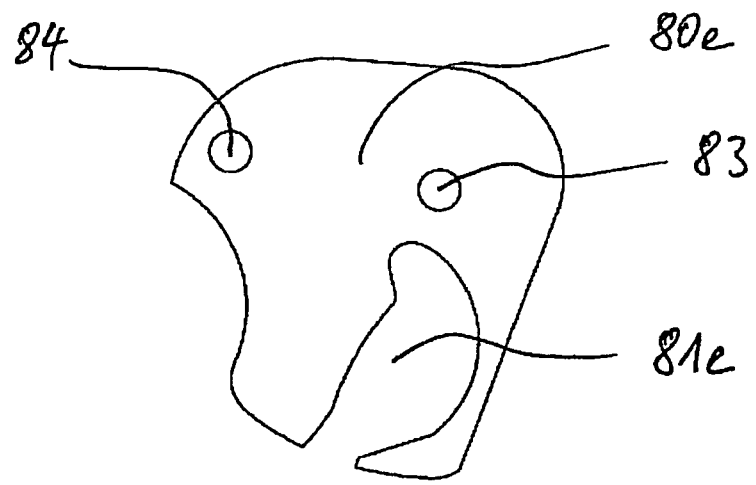

The outputs 80c, 80d, 80e illustrated in FIGS. 4c-4e include guide slots 81c, 81d, 81e with particularly adapted configurations of the inner contours, which provides particular adaptations to the leverages during closing- and opening operations. The shape of the guide slots defines the size of the torque and the movement velocity of the output in each particular point of the movement of the lock.

Thus a particular configuration of the guide slot 81b, 81c, 81d, 81e facilitates a precise adaptation of the torque and the velocity for the particular phases of the opening and closing process. Based on the position of the guide slots 81a, 81b, 81c, 81d, 81e with reference to the bore hole 83 for receiving the output rotation axle 44 and the bore hole 84 for receiving the locking element rotation axle 51 the geometry of the right flank respectively determines torque and velocity curves during the closing process and the geometry of the left flank respectively determines torque and velocity curves during the opening process of the lock 30.

From the preceding descriptions it is apparent that a particularly effective, loadable and safe lock 1, 20, 30 is provided through the closure lock 1, 20, 30 according to the invention which is actuatable through only one power drive and which provides robust self blocking also against strong vibrations and crash energies.

What is claimed is:

1. A lock for a closure comprising:
a locking element which is movable in a locking element moving direction; and
an input for moving the locking element between an unlocked position for placing a lock into an unlocked condition and a locked position for placing the lock into a locked condition,
wherein the input is arranged movable in an input movement direction,
wherein the lock includes a blocked condition in which the locking element is blocked relative to movement in the locking element moving direction,
wherein the locking element is arranged at an output which is arranged movable in an output movement direction and which is connected to the input at least in the blocked condition through a first form locking engagement,
wherein the first form locking engagement is configured, so that it transfers no movement between the output moving in the output movement direction and the input moving in the input movement direction,
wherein a second form locking engagement or friction locking engagement is provided between the input and the output for providing a movement transfer between the output moving in the output movement direction and the input moving in the input movement direction,
wherein the second form locking engagement or friction locking engagement is not provided at least in the blocked condition, so that a blocking of the lock is caused at least in the blocked condition,
wherein the lock is movable from the unlocked condition into the locked condition and from the locked condition into the blocked condition respectively through a continuous movement of the input, and
wherein the input is movable in a clockwise direction and in a counterclockwise direction.

2. The lock according to claim 1, wherein the output is supported rotatable about an output rotation axle or the input is supported rotatable about an input rotation axle.

3. The lock according to claim 1, wherein the output includes a guide slot for a lever element of a lever wheel arranged at the input in order to provide the second form or friction locking engagement.

4. The lock according to claim 3, wherein the input includes a circular segment shaped section which engages a corresponding section of the output in a form locking manner at least in a blocked condition of the lock in order to provide the first form locking engagement.

5. The lock according to claim 4, wherein the circular segment shaped section is not formed at least in portions between the lever element and an input rotation axle, so that the output is not in a form locking engagement with the input at least for a period of time during a transition between the blocked condition and the unlocked condition.

6. The lock according to claim 1, wherein the locking element is movably connected with the output.

7. The lock according to claim 6,
wherein the locking element is arranged rotatable about a locking element rotation axle at the output,
wherein the locking element rotation axle and an output rotation axle do not coincide,
wherein the output includes a guide element which engages a circular segment shaped cut out of the locking element, and
wherein the circular segment shaped cutout is arranged concentric to the locking element rotation axle and the locking element is preloaded in closing direction.

8. The lock according to claim 1, wherein the locking element is fixated at the output.

9. The lock according to claim 1,
wherein at least one end position switch is associated with the input, wherein the input actuates the at least one end position switch when an end position of the input is reached, and
wherein the at least one end position switch interrupts a power actuation of the input.

10. The lock according to claim 1, wherein input engagement devices are arranged at the input for engaging corresponding supplemental engagement devices, so that the input is actuatable by hand in order to facilitate opening and closing the lock by hand.

11. The lock of claim 1, wherein the input includes a lever wheel.

12. The lock according to claim 1, wherein the input includes a circular segment shaped section which engages a corresponding section of the output in a form locking manner at least in a blocked condition of the lock in order to provide the first form locking engagement.

13. The lock according to claim 3, wherein the guide slot includes at least one portion which includes at least one wall section that does not extend perpendicular with reference to the output movement direction.

14. The lock according to claim 8, wherein the locking element is integrally provided in one piece with the output.

15. The lock according to claim 10, wherein each input engagement device is configured as a hexagonal or polygonal socket arranged on an input rotation axle.

\* \* \* \* \*